Aug. 9, 1932.  W. C. PITTER  1,870,645

ROTARY CLUTCH MECHANISM

Filed Dec. 4, 1930

Inventor
Walter Charles Pitter
By Luther Johns
atty.

Patented Aug. 9, 1932

1,870,645

UNITED STATES PATENT OFFICE

WALTER CHARLES PITTER, OF EPPING, ESSEX, ENGLAND, ASSIGNOR TO THE PITTER TRUST, OF CHICAGO, ILLINOIS, A COMMON LAW TRUST

ROTARY CLUTCH MECHANISM

Application filed December 4, 1930. Serial No. 499,889.

This invention relates to one-way rotary clutch mechanisms having outer and inner coaxial members.

In my copending application Serial No. 293,593, filed July 18, 1928 I have shown and claimed a clutch of the general character of the one illustrated herein. According to the present device I may obtain a more powerful interlock or grip through a given amount of angular driving member movement, highly important in view of the film of oil between the elements clutched together and which must be broken down before the desired strong and rigid interlock is obtained. By these improvements, also, I may obtain the necessary gripping action in many instances with a lesser amount of circumferential movement of the driving member than according to my said copending application, which means in a shorter interval of time. In the device of my said copending application centrifugal force tends to maintain the clutch in operation at the instant of the release or declutch, while according to these improvements the reverse action occurs and the centrifugal force aids the release of the clutch. Other objects and advantages will appear hereinafter.

Figure 1:
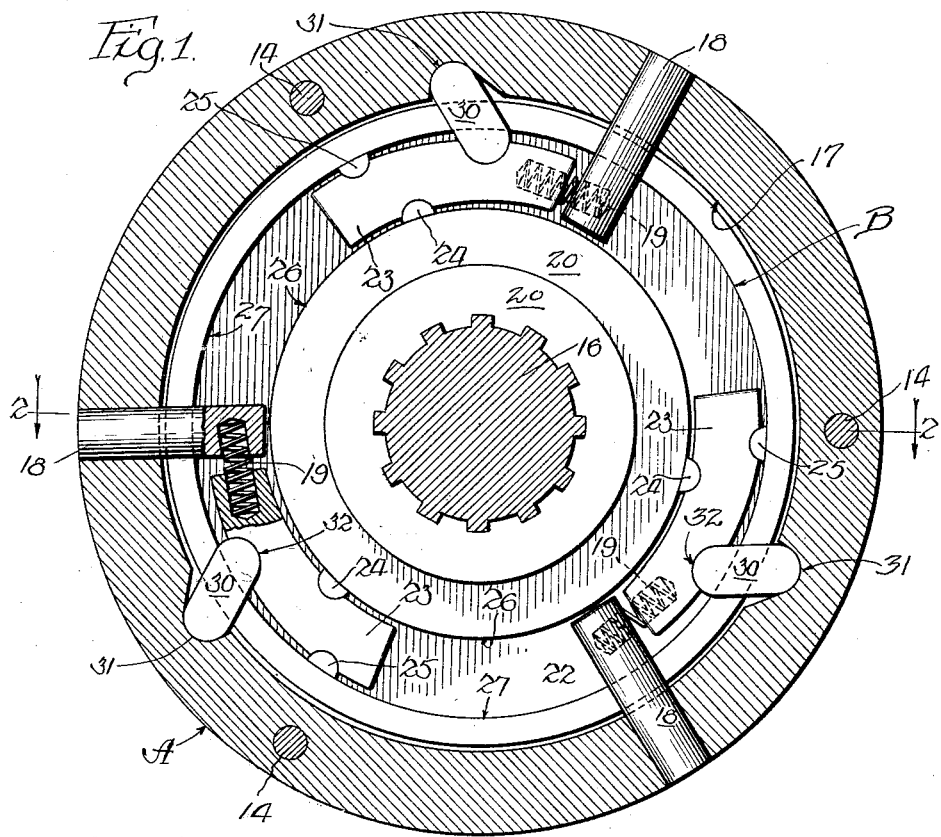
Figure 2:
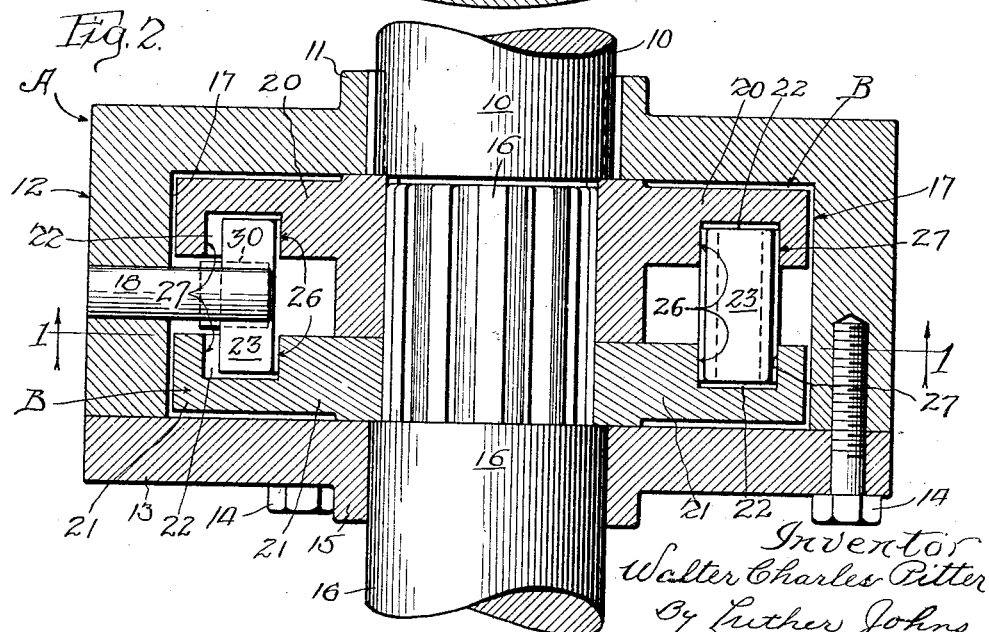

Figure 1 is a cross section of an embodiment of my improved clutch on the line 1—1 of Fig. 2; and Fig. 2 is a horizontal medial section of same on the line 2—2 of Fig. 1.

The driving shaft 10 is rigidly secured to the hub portion 11 of a casing or housing forming the shell or the outer or driving member marked as a whole A. This housing consists of a cylindrical cup-shaped member 12 closed by an end wall 13 removably held by bolts 14, this end wall having a hub portion 15 bearing on output or driven shaft 16. Member A has an inner cylindrical surface 17. Three radially-directed pins 18 are secured in housing A and are bored to receive coiled expansion springs 19 respectively.

Inner member B is shown formed in two pieces 20 and 21 each having an annular groove, recess or way 22, rectangular in cross view. These grooves 22 are opposite each other and form a single channel in the body of member B. In this annular channel are positioned three elongated levers, clutch pieces or grippers 23.

At 24 and 25, circumferentially offset from each other in each instance, are semicylindrical recesses in grippers 23 in which are positioned correspondingly shaped contact or wear pieces freely movable so that they may adjust themselves to the curved surfaces 26 and 27 respectively of the circular groove 22. These wear and pressure blocks 24 and 25 are described and claimed in my said copending application.

Three struts 30, one for each gripper, are directed somewhat tangentially with respect to inner member B. They are directed inward and forward from their bearing seats at 31 in driving member A. At 32 these struts are seated in the clutch elements or grippers 23. Springs 19 press the front end of the grippers (adjacent to the springs) radially outward and maintain grippers 23 and struts 30 in tight relation to each other ready for a clutching operation. The parts 20 and 21 of member B are held rigidly on shaft 16 so that when member B is rotated shaft 16 is driven.

The action is as follows: Assuming in Fig. 1 member A to be driven in the clockwise direction, the front ends of struts 30 are moved forward and inward so as to force what we will here call the front end of the gripper levers 23 inward. This causes wear elements 24 to bind against surface 26 and wear elements 25 to bind against wear surface 27, and this action locks the two members together. The greater the driving power or the greater the resistance the stronger becomes the interlock. The principles involved generally are those of my said copending application, but through the present organization struts 30 communicate driving power from the outer member instead of from the inner member, and we have results which differ in various respects. For one thing, since the struts 30 are pivoted or mounted to swing as at 31 at a place quite materially farther from the center on a radial line the degrees of arcuate movement at 31 are considerably longer than they would be if the struts were pivoted to member B and therefore closer to the axis. Consequently, if we consider some very slight movement of one member relative to the other necessary to bring about the gripping action, the equivalent of that slight movement is appreciably more at 31 than it would be at the end of a shorter radius. In other terms, in a given instance of time the pivotal place at 31 has moved farther circumferentially than according to the prior device referred to. From these considerations it results that a greater amount of gripper binding movement may be had through applying a greater force through a longer movement, yet in the same time.

The device is so constructed that a very slight amount of movement only is necessary to bring about the desired clamping action. By the present construction I therefore gain the advantage of gripping the parts together through a smaller amount of circumferential movement than according to said prior device, and therefore in a shorter time.

The time element in question is exceedingly small, and yet clutches of the present type, and especially of the kind developed by me according to my said copending application, are used in many instances for precision operations of very high order. In such case it is highly important that the clutching and declutching operations shall be as nearly instantaneous as possible. According to these improvements I gain the advantage of an appreciably quicker application of the driving power.

Another advantage resides in the centrifugal action of these somewhat floating elements as 23 and 30, especially 23. When the device is rotating at sufficient speed the tendency of the free ends of these members, meaning the end farthest from the clamping surfaces, is to swing outward. So long as the driving power is being applied this centrifugal action is negligible, having no effect at all. When the driving power is discontinued, however, the inner member should at once begin to run freely in the same direction. According to the older construction the centrifugal action operated to carry the grippers away from the struts, while in this case it operates to move them toward the struts, and the tendency is to release the clutch. This affords centrifugal aid in releasing the grippers to permit the inner or driven member to run freely the instant the driving force is discontinued or slowed.

In my copending application Serial No. 498,209, filed November 26, 1930, on Clutch mechanisms, I have shown a device in which the tiltable clutching levers or grippers operate upon annular surfaces on the inner and outer members respectively, as distinguished from the present case and my first-mentioned copending application in which the grippers operate in a groove or channel entirely in one of the members. The present improvements are applicable also to constructions operating on the principle of said last-mentioned copending application, and they are applicable also to various other clutch mechanisms which may depart in various respects from what I have illustrated and described in my own cases. I therefore contemplate as being included in these improvements all such changes, variations and departures from what is thus specifically illustrated and described as fall within the scope of the appended claims.

I claim:

1. In a rotary clutch of the character described, an inner member and an outer member coaxially arranged, the inner member having a coaxial channel having radially opposed walls, an elongated gripper element having opposed gripping surfaces in said channel, a spring near one end of said gripper element and carried by the outer member to force the gripper element rearward, and a strut element carried by the outer member and directed inwardly and forwardly to tilt the gripper element to bind it in said channel when the outer member moves forward relative to the inner member.

2. In a clutch of the character described, the combination of a driving member comprising a housing-like structure having a hollow interior, an inner member on the axis of the driving member, with means for driving the inner member from the outer member, said means including walls forming an annular channel in the inner member, an elongated gripper in said channel and having surfaces circumferentially spaced apart adapted to bind upon opposed surfaces of said channel, means for maintaining the gripper yieldingly in non-gripping position, and a strut member mounted in the outer member and in said gripper and arranged to force inward a portion of the gripper circumferentially spaced from said binding surfaces thereon to tilt the gripper and to bind it in said channel when the outer member moves rotatively in a given direction relative to the inner member.

3. A rotary clutch of the character described comprising an outer member in the shape of a cylindrical casing and an inner member coaxially arranged therewith, the inner member being provided with an annular coaxial channel radially spaced over its entire length from the inner wall of the outer member, a movable gripper element within the channel of the inner member, a yielding connection between one end of said gripper element and the outer member, and a non-yielding connection between the outer member and said gripper element, said non-yielding connection being movably seated in said gripper element and outer member and extending to a portion of said gripper element between the ends thereof, the gripper element being adapted upon angular displacement to enter into binding connection with opposite wall portions of the channel in the inner member.

4. A rotary clutch of the character described, comprising an outer member in the form of a cylindrical casing, a driving shaft on which said cylindrical casing is fixedly mounted, a driven shaft in axial alinement with said driving shaft, a member mounted on said driven shaft within the cylindrical casing, the cylindrical casing having a central aperture through which the driven shaft extends, the inner member being provided with an annular coaxial channel, a gripper element loosely slidable and tiltable within said annular channel, a yielding connection between the outer member and one end of said gripper element, said yielding connection being adapted to impart a sliding movement to said gripper element within said channel upon rotation of the outer member relatively to the inner member, and a rigid connecting element movably seated in the outer member and in the gripper element, and adapted to impart to the gripper element a tilting movement upon relative rotation of the inner and outer members, said gripper element being adapted upon being tilted to bind against opposite sides of the annular channel of the inner member.

5. A rotary clutch, comprising an outer cylindrical casing, a driving shaft extending in an end wall of said casing and secured to said end wall, the opposite end wall being provided with a central bearing opening, a driven shaft rotatably supported in said bearing opening and projecting into the interior of the cylindrical casing, an inner driven member mounted on the projecting part of the driven shaft within the driving casing, said inner member being provided with an annular channel spaced from the outer wall of said inner member and being provided with a circumferential passage communicating between said channel and the outer circumference of the inner member, a gripper element slidably and tiltably mounted in said annular channel, a connector fixedly secured to the cylindrical wall of the casing and projecting into said channel, a spring inserted between the end of the gripper element and the end of the connector pin, and a strut pivotally seated in the cylindrical wall of the casing at one end and within a recess of the gripper element at the other end, said connector pin and strut extending through the circumferential passage of said inner member, the gripper element being adapted upon being tilted by the strut to bind against opposite annular wall surfaces of the channel in the inner member.

6. A rotary clutch of the character described, comprising a drive shaft, a cylindrical casing secured to the end of the drive shaft, a driven shaft loosely projecting through an end wall of the cylindrical casing into the interior thereof, a driven member secured to the projecting portion of the driven shaft and provided with an annular channel of rectangular cross-section, the axial length of said annular channel exceeding the radial height thereof, a gripper element loosely located within said annular channel, a circumferential passage in said driven member communicating with said annular channel, a pin secured to the cylindrical wall of the casing and projecting through said circumferential passage into the annular channel, the pin being provided with a socket at its inner end, the gripper element also being provided with a socket, a spring inserted in said sockets and connecting the pin yieldingly with said gripper element, a rigid strut pivotally seated in the cylindrical wall of the casing at one end and pivotally seated in the gripper element at the other end, whereby upon relative rotation of the casing to the driven member, a sliding and tilting movement is imparted to the gripper element, the gripper element being provided with an enlarged head in opposition to the end at which the spring is seated therein, and means on the enlarged portion of the gripper element for engaging opposite annular surface wall portions of the channel in the driven member.

WALTER CHARLES PITTER.